Dec. 19, 1967  R. K. NELSON ETAL  3,358,517
AIR SHIFT FOR TWO-SPEED AXLE
Filed March 3, 1965  3 Sheets-Sheet 1

INVENTORS
ROBERT K. NELSON
BY GEORGE L. MOLDOVAN

Hoffmann and Joint
ATTORNEYS

Dec. 19, 1967 R. K. NELSON ETAL 3,358,517
AIR SHIFT FOR TWO-SPEED AXLE
Filed March 3, 1965 3 Sheets-Sheet 2

INVENTORS
ROBERT K. NELSON
GEORGE L. MOLDOVAN
BY
Hoffmann and Court
ATTORNEYS

United States Patent Office
3,358,517
Patented Dec. 19, 1967

3,358,517
AIR SHIFT FOR TWO-SPEED AXLE
Robert K. Nelson, Shaker Heights, and George L. Moldovan, Willowick, Ohio, assignors to Eaton Yale & Towne Inc., a corporation of Ohio
Filed Mar. 3, 1965, Ser. No. 436,887
9 Claims. (Cl. 74—110)

The present invention relates to a mechanism for shifting a power transmitting element between power transmitting positions, and more particularly to a mechanism for shifting a change speed gear between power transmitting positions.

Known mechanisms for shifting a power transmitting gear element between power transmitting positions have been constructed so as to permit pre-selection of the position of the gear, but without any shifting actually taking place until the torque transmitted through the gear element is materially reduced from that normally transmitted through it during operation. These known mechanisms have been rather complex and include structure such as springs to store energy under a pre-select condition.

Accordingly, the principal object of the present invention is the provision of a new and improved mechanism for shifting a power transmitting element between power transmitting positions and which is reliable in operation, is simple in construction, has a long life, and is constructed and arranged to shift the power transmitting element when the torque transmitted through the element is materially reduced from that normally transmitted during operation without the necessity of structure for storing energy such as preload springs.

A still further object of the present invention is the provision of a new and improved mechanism for shifting a power transmitting element between power transmitting positions including a spring member operable to urge the power transmitting element to one position and a piston mechanism operable to apply a force to overcome the spring member and move the power transmitting element to another position.

Another object of the present invention is the provision of a new and improved shifting mechanism for moving a change speed torque-transmitting element between high and low speed positions and wherein the torque-transmitting element is moved from its low speed position to its high speed position by a fluid actuated piston means which acts against a spring member and wherein the spring member acts to move the shiftable element to its low speed position from its high speed position.

Yet another object of the present invention is the provision of a new and improved shifting mechanism for a torque-transmitting element, as noted in the next preceding paragraph, wherein the frictional forces in the shifting mechanism are held to a minimum so that the only significant forces involved in shifting the torque transmitting element are the fluid pressure exerted on the piston member and the spring force applied by the spring to resist movement of the piston member.

A still further object of the present invention is the provision of a new and improved mechanism for shifting a change speed gear between high and low speed positions including a piston member connected to a piston rod which in turn is connected with the change speed gear and a spring means encircling the piston rod and urging the piston member and piston rod to a position wherein the change speed gear is in its low speed position.

A still further object of the present invention is the provision of a new and improved mechanism, as noted in the next preceding paragraph, wherein a plurality of guide means encircle the piston member and piston rod and guide the movement of the piston member and piston rod so that wobble and vibration thereof are minimized.

An additional object of the present invention is the provision of a new and improved shifting mechanism for moving a change-speed gear between its high and low speed positions including a piston member operatively connected to the change gear member and which is movable by air pressure to move the change-speed gear, and wherein a rolling type diaphragm is connected to the piston member and the housing in which the piston member moves and provides a seal therebetween.

A still further object of the present invention is the provision of a new and improved shifting mechanism, as noted in the next preceding paragraph, wherein the housing in which the piston member moves is vented on the side of the diaphragm seal opposite the side against which the air pressure is applied to move the piston member so as to prevent a build-up of air pressure causing the rolling diaphragm to distort to the pressure side of the piston member and thus cause malfunctioning thereof.

Further objects and advantages of the present invention will be apparent to those skilled in the art to which it relates from the following detailed description of a preferred embodiment thereof made with reference to the accompanying drawings forming a part of this specification and in which.

Figure 1:
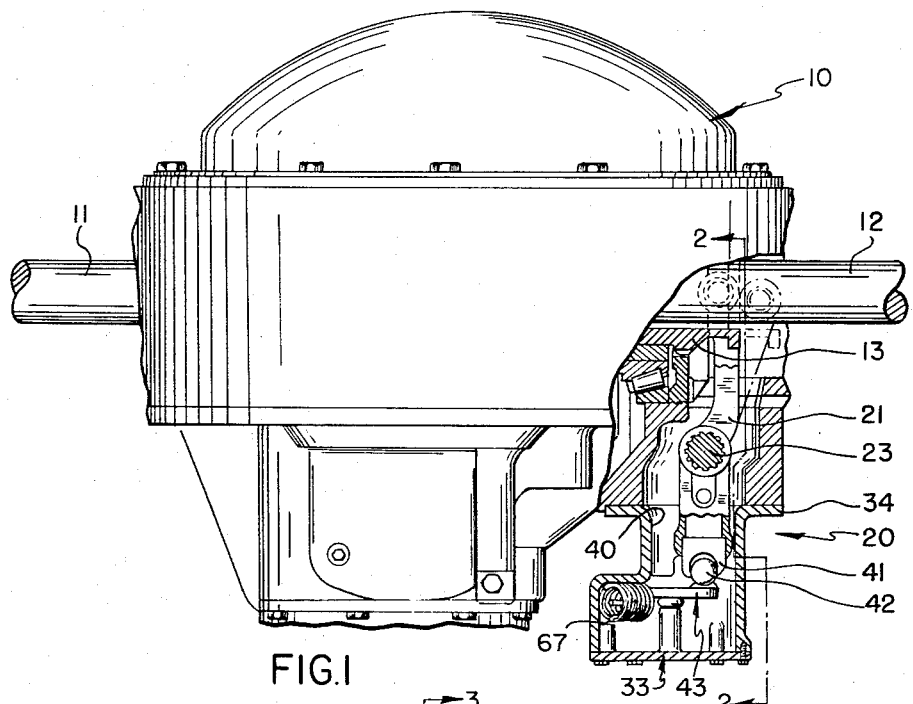
FIG. 1 is a top elevational view, partly in section, of a two speed axle mechanism embodying the present invention.

The present invention provides a mechanism for shifting a power transmitting element between power transmitting positions. More specifically the invention provides a mechanism for shifting a change speed torque transmitting element between high and low speed positions and wherein the shifting of the element is effected when the torque transmitted through the element is materially reduced from that normally transmitted through it during operation. By way of example, the present invention is illustrated as preferably embodied in a two speed rear axle mechanism 10 for a motor vehicle.

The two-speed axle 10 functions to drive the wheels of the vehicle in which it is embodied. The axle mechanism 10 includes a pair of drive shafts 11 and 12 which extend to the opposite wheels of the vehicle which are driven by the axle 10. The shafts 11 and 12 may be driven at selected speeds depending upon the position of a torque transmitting element 13, forming a part of the axle 10. The torque transmitting element 13 comprises a gear member in the form of a sleeve having gear teeth thereon and which is shiftable between two torque transmitting positions wherein the gear member 13 cooperates with other drive elements of the axle to drive the shafts 11, 12 at a speed dependent upon the position of the gear member 13. The specific construction of the two-speed axle 10 and the particular relationship of the gear member 13 with the other drive parts of the axle 10 are known and reference may be made to United States Patent No. 2,462,779 for an illustration of the detailed structural features of the axle.

The gear member 13 has a plurality of gear teeth sets thereon which cooperate with different parts of the axle 10 and is shiftable along the axis of the shaft 12 between two positions shown in full lines and dot-dash lines, respectively, in FIG. 1, and in which the gear teeth on the gear member 13 cooperate with different drive elements forming a part of the axle. In the two positions of the gear member 13, separate driving teeth on the sleeve member engage separate tooth members forming a part of the drive axle and a torque transmitting pressure relationship is established between the teeth of the drive elements and provides a force resisting axial movement or shifting of the gear member, as noted in the above mentioned patent. This torque transmitting pressure will vary during the operation of the axle as is well known, but must be overcome to effect shifting of the gear element 13.

Figure 2:
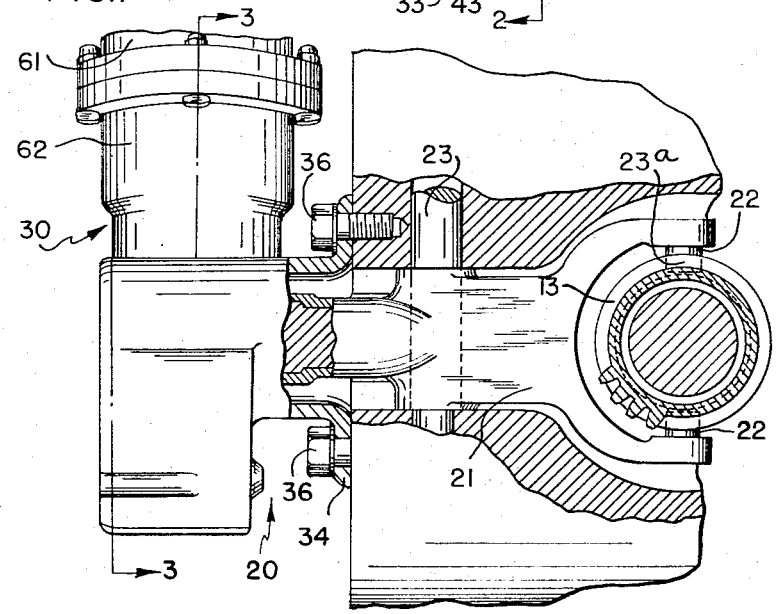
FIG. 2 is a fragmentary sectional view of the mechanism shown in FIG. 1, taken approximately along the section line 2—2 of FIG. 1.

The axle 10 includes means 20 for shifting the torque-transmitting element or gear 13 between its two positions, namely, between its high and low speed positions, shown in full lines and in dot-dash lines, respectively in FIG. 1. The means 20 for shifting the gear member 13 between its high and low speed positions includes a lever member 21, one end of which is bifurcated and forms a yoke that fits over the axially outer end of the sleeve 13. The opposite arms of the yoke are each provided with inwardly directed pin members 22, as best seen in FIG. 2, which pin members are received in a peripheral groove 23a in the sleeve 13 on diametrically opposite sides of the axis of the latter. The lever 21 is rotatably mounted on a pin member 23 which is fixedly supported in the housing of the differential or drive axle 10. The pin member 23 extends through the lever 21 intermediate its ends and supports the lever for pivotal movement about the axis of the pin member 23.

The means 20 for moving the sleeve member 13 axially along the shaft 12 also includes a power shift mechanism 30 which is operatively connected to the end of the lever member 21 opposite the end connected to the member 13. The power shift mechanism 30 is operable to pivot the lever member 21 about the axis of the pin member 23 and thereby effect movement of the gear 13. The mechanism 30 is a fluid actuated mechanism and in general includes a piston mechanism 31 actuated in response to fluid pressure being applied thereto and a linkage mechanism 32 operatively connected to the piston mechanism 31 and to the outer end 21a of the lever 21.

Figure 4:
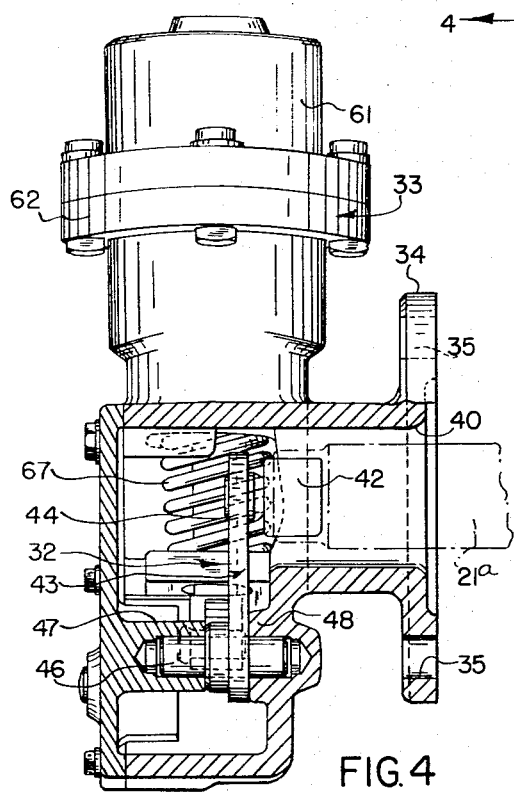
FIG. 4 is a vertical sectional view of the mechanism shown in FIG. 3, taken approximately along the section line 4—4 of FIG. 3.

The piston mechanism 31 and the linkage mechanism 32 are supported in a common housing 33. The housing 33 includes a flange portion 34 at the right end thereof, as viewed in FIG. 4, which flange portion has openings 35 therethrough which are adapted to receive suitable fasteners in the form of studs and nuts, generally designated 36, for securing the housing 33 and the mechanism 30 to the housing of the differential or two-speed axle 10. A suitable seal is provided between the flange portion 34 and the housing 33 and through which the lever member 21 extends so that lubricant in the housing 33 does not leak therefrom. The flange portion 34 of the air shift unit has an opening 40 therethrough communicating with the interior of the axle housing 10. The outermost end 21a of the lever member 21 extends through the opening 40 and into the interior of the housing 33 of the shift unit 30.

Figure 3:
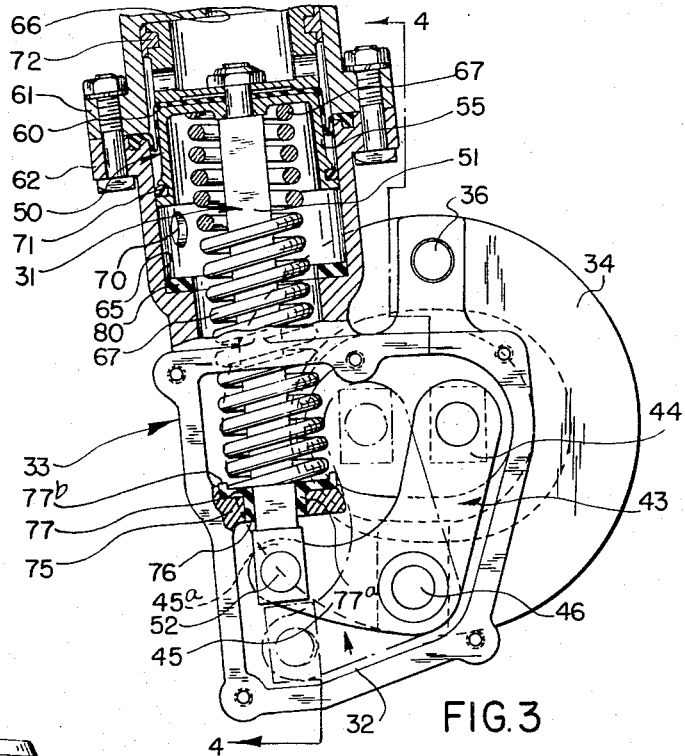
FIG. 3 is a sectional view of the mechanism shown in FIG. 2, taken approximately along the section line 3—3 of FIG. 2.

The end 21a of the lever member 21 is operatively associated with the linkage mechanism 32 so as to be moved thereby. The outermost end 21a of the lever member 21 is bifurcated, as shown at 41, and a lug member 42 is positioned between the bifurcated portions of the outermost end of the lever member 21. The lug member 42 forms a portion of the linkage mechanism 32 for actuating the movement of the lever 21 and is operatively connected to a bell crank member 43. The bell crank member 43 is pivotally supported for movement relative to the housing 33 and comprises a bell crank arm 44 extending substantially vertically, as shown in FIG. 3, and a bell crank arm 45 extending substantially horizontally, as shown in FIG. 3. The bell crank member 43 is pivotally supported for movement relative to the housing 33 by a pivot pin 46, the opposite ends of which are supported by boss portions 47 and 48 of the housing 33.

As noted above, the outermost end of the arm 44 of the bell crank 43 is connected with the lever 21, and the outermost end of the arm member 45 is operatively connected with the piston actuating mechanism 31 and is movable upon actuation of the piston actuating mechanism 31 and upon movement, causes pivoting movement of the bell crank 43 and movement of the lug member 42 which, in turn, causes movement of the lever 21 and shifting movement of the gear member 13, as will be described hereinbelow.

The piston mechanism 31 which is operatively connected to the bell crank 43 comprises a piston member 50 and a piston rod 51 which is connected at one end of the piston member 50 and at its opposite end to the outermost end of the bell crank arm 45. The connection of the piston member 51 to the arm 45 of the bell crank 43 permits the reciprocatory movement of the piston rod 51 to be transmitted to oscillatory movement of the arm 45 about the pivot pin 46. The end of the piston rod 51 connected to the arm 45 is bifurcated and the arm 45 is provided with a slot 45a formed in a portion of the arm 45 extending between the bifurcated portions of the piston rod 51. A clevis pin 52 extends through the slot 45a and is supported by the opposite portions of the piston rod 51. Thus, it can be seen that the reciprocatory movement of the piston rod and pin 52 is transmitted to oscillatory movement of the arm 45 and bell crank 43.

The end of the piston rod 51 opposite from the end connected to the bell crank 43 is connected to the piston 50. The piston member 50 includes a cup-shaped member 53 having a base portion 56 and an annular skirt portion 55 which extends downwardly from the base portion 56, as viewed in FIG. 5. The base portion 56 of the piston member 50 is clamped against the outermost end of the piston rod 51 by means of a suitable screw and nut connection including a screw 57 and a nut 58.

The screw 57 is fixedly connected to the uppermost end of the piston rod 51 and extends through an opening in the base portion 56 of the member 53 and through an aligned opening in the base portion 59a of a cup-shaped member 59 which is similar to the cup-shaped member 53. The cup-shaped member 59 includes an annular skirt portion 59b which extends upwardly from the base portion 59a and forms a recess therein. The nut member 58 is received in the recess and threadedly engages the outermost end of the screw member 57 and clamps the cup-shaped members 59 and 53 together. The members 59 and 53 thus form the piston member 50, which thereby comprises a two piece unit.

Figure 5:
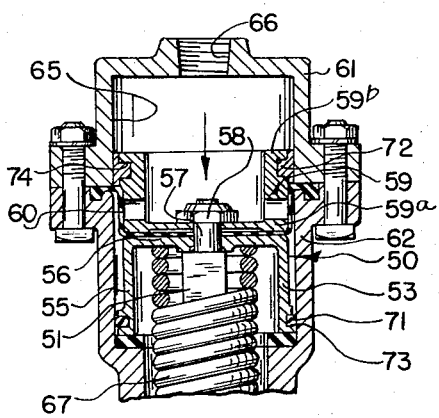
FIG. 5 is a section view of the mechanism similar to FIG. 3, but showing parts in different positions.

As noted hereinabove, the power shift mechanism 30 is an air actuated mechanism and the piston member 50 is moved from a low speed position to a high speed position by air pressure being applied thereto. The piston member 50 moves in a piston chamber or bore 65 formed in the upper portion of the housing 33, as viewed in FIG. 3. FIG. 3 shows the position of the piston member 50 at low speed, while FIG. 5 shows its position at high speed. The piston member 50 is moved from its low speed position to its high speed position upon the application of an air pressure above the piston member and to this end, the portion of the chamber 65 above the piston member 50 is provided with a suitable opening 66 which is connected with a suitable source of air pressure. The air pressure is controlled in a conventional manner from a suitable reservoir tank.

In order to prevent air from leaking around the piston member from the upper portion thereof, a suitable sealing means is utilized surrounding the piston member and maintaining the air pressure in the portion of the chamber 65 above the piston member 50. This sealing means comprises a suitable rolling type seal or diaphragm 60. The rolling type diaphragm is a flat flexible member which is clamped around its periphery between portions 61 and 62 of the housing 33. The portions 61, 62 of the housing define the chamber 65 and the rolling diaphragm extends transversely of the chamber 65. The rolling type diaphragm includes a portion lying between the base portions 56, 59a of the members 53, 59, and a portion 60a which lies in surrounding relation to the annular skirt portion 55 of the member 53. Upon the application of fluid pressure to the opening 66 and movement of the piston member 50 in the bore 65, the rolling diaphragm seal moves with the piston member and maintains a rolling-type contact between the piston member 53 and the bore 65 in order to maintain a seal therebetween and prevent any air pressure from moving beneath the piston member 50. The outer surfaces of the skirt portions 59b and 55 are provided with suitable clearance for movement of the rolling diaphragm. The skirt portion 59b of the member 59 is provided with openings therein so that air pressure is applied to the rolling seal at the periphery thereof so as to facilitate movement thereof. FIG. 5 shows the position of the rolling seal when the piston member has been moved to its lowermost position in the bore 65.

The bore 65 is provided with at least one air opening 70 beneath the piston member 50 and provides for venting any air pressure which may leak thereinto from beneath the piston member 50. If an air pressure could build up in the chamber 65 below the piston 50, when the pressure in the chamber above the piston member 50 is dumped or reduced, the pressure below the piston member 50 would tend to distort the diaphragm seal 60 from the position shown in FIG. 3 to a position wherein the diaphragm extends vertically which would tend to cause a pinching of the diaphragm and cause malfunctioning thereof.

Movement of the piston member 50 in the bore 65 is stabilized by means of a plurality of ring members 71, 72, preferably made of nylon, and which are supported by the piston member 50 in encircling relation thereto. The nylon ring member 71 is positioned in an annular groove 73 at the bottom end of the skirt portion 55, as viewed in FIG. 3, and engages the walls of the bore 65. The nylon ring member 72 is positioned in an annular groove 74 at the upper end of the skirt portion 59b and engages the bore 65. The nylon ring members 71, 72 function to laterally stabilize the movement of the piston member 50 so that it does not wobble or vibrate and guide the piston 50 with a minimum of friction.

The piston member 50 is biased upwardly to its low speed position by a suitable spring means which also resists downward movement thereof, as viewed in FIG. 3. The piston member 50 is biased upwardly to a position wherein the upper end of the skirt portion 59 engages the upper end of housing portion 61 in which opening 66 is positioned. The spring means which resists movement of the piston member 50 comprises a suitable coil spring member 67. The coil spring member 67 encircles the piston rod 51 and the clearance between the piston rod 51 which is preferably square in cross section and the inner diameter of the coil spring 67 is held to a minimum so as to prevent cocking of the spring member 67 and thus maintains a substantially constant force acting against movement of the piston 50. The spring member 67 engages the underside of the base portion 56 of the cup-shaped piston member 50, as viewed in FIG. 3, and the other end of the coil spring 67 engages a guide ring member 77 supported by a flange portion 75 forming a portion of the housing 33.

The flange portion 75 of the housing comprises a member which preferably is secured in the housing 33 and extends into the interior thereof in a cantilever fashion, as best shown in FIG. 3. The flange portion 75 has an opening 76 therethrough through which the piston rod 51 extends. A guide ring in the form of a nylon bearing is positioned with a portion 77a thereof in the opening 76 and bears against the piston member 51 and guides the piston member in a substantially frictionless manner. The nylon bearing 77 has a base portion 77b which is integral with the portion 77a and is supported by the flange portion 75 and is engaged by the spring member 67. The end of the spring member 67 is supported in a recess in the nylon bearing.

As noted above, the piston member 50 is moved, upon application of air pressure thereto, from its low speed position, shown in FIG. 3, downwardly to its high speed position, shown in FIG. 5. A bumper member 80 is supported in the housing 33 and engages the outermost end of the skirt portion 55 of the member 53 so as to limit movement of the piston member in a downward direction, as viewed in the drawings, and defines the high speed position of the piston member.

From the above description, the operation of the device embodying the present invention should be apparent. Normally, the piston member 50 is maintained in its low speed position shown in FIG. 3 by the spring member 67. When it is desired to shift the axle 10 from a low speed ratio to a high speed ratio by moving the gear or sleeve member 13 from the dot-dash position shown in FIG. 1 to the full line position shown in FIG. 1, air pressure is applied to the bore 65 above the piston member 50 to move the piston member 50 to its high speed position shown in FIG. 5. The effective force tending to shift the gear 13 from the low speed ratio to the high speed ratio when air pressure is applied to piston member 50 is of a relatively low magnitude and is not sufficient to disengage the teeth of the gear member 13 from the cooperating teeth of the torque member in the axle when they are in engagement transmitting torque. The force tending to move the member 50 is determined by the particular size of the piston member 50 and magnitude of the air pressure applied thereto and the fact that the compression spring 67 resists the movement of the piston member. Thus, the air pressure must overcome the force of the spring member 67, as well as the force of the cooperating gear teeth in the axle 10 before the sleeve member 13 is moved from its low speed ratio to its high speed ratio. When the torque transmitted through the cooperating gear teeth is reduced the shifting of the gear member 13 occurs.

On the other hand, when the axle is shifted from its high speed ratio to its low speed ratio, the only effective force acting to move the lever 21 to its low speed position is the spring force, since the air chamber is vented. The force applied by the spring is not sufficient to disengage the teeth of the gear 13 from the teeth of the cooperating part when a load is being transmitted therethrough at high speed. However, as soon as the torque being transmitted through the teeth of the sleeve 13 decreases, the spring member 67 functions to move the sleeve member to its low speed position.

In view of the importance of the relative forces applied to the lever member 21 it is important to minimize the friction losses in the power shifting mechanism 30 so that shifting of the gear 13 is accomplished at the proper or desired time. It can be seen that the friction losses are held to a minimum through the use of the nylon guides 71, 72, 77 which function to guide the movement of the piston member 50 and piston rod 51 and a low friction connection between the piston rod and the outermost end of the bell crank lever 45. Moreover, due to the maintaining of a small clearance between the outside diameter of the push rod 51 and the inside diameter of the spring, collapse of the coil spring and thus a change in the spring rate is substantially minimized.

Figure 6:
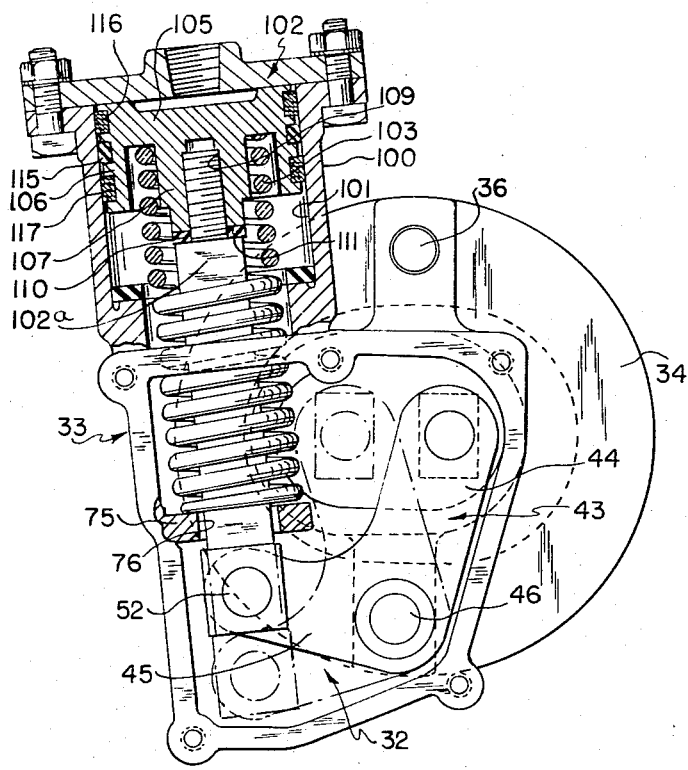
FIG. 6 is a fragmentary sectional view of another embodiment of the present invention.

The modification of the present invention shown in FIG. 6 is similar to the modification shown in FIGS. 1–5. The housing 100 of the shift mechanism, shown in FIG. 6, has a bore 101 in the upper portion thereof in which a piston member 102 is movable. The piston member 102 is connected to a piston rod 102a and is movable in the bore 101 upon the application of air pressure to the upper portion thereof, as shown in the drawings, and the piston member is biased to its upper position by means of a spring 103 which functions in the manner described hereinabove in connection with the embodiment shown in FIG. 1. The piston rod 102a is connected to a suitable linkage for effecting movement of the change-speed gear as described in connection with the embodiment of FIG. 3.

The piston member 102 is a cup-shaped member having a base portion 105 and an annular skirt portion 106 extending axially from the base portion 105. A centrally located projecting portion 107 is integral with the base portion 105 and extends downwardly therefrom, as shown in FIG. 6, toward the piston rod 102a. The projection 107 has an internally threaded opening 109 therein, and the uppermost end of the piston rod 102a is threaded into the opening 109. The upper end of the piston rod 102a is provided with a shoulder 110 and a suitable lock washer 111 is located between the lowermost end of the projection 107 and the shoulder 110. The spring 103 which biases the piston member 102 to the position shown in FIG. 1 encircles the projection 107 and engages the base portion 105 of the piston member.

Suitable sealing means are arranged for providing a sealing cooperation between the periphery of the piston member 102 and the bore 101 so as to prevent leakage of air past the piston member 102. This sealing means comprises a sealing ring member 115 located in a suitable groove in the skirt portion of the piston member 102 and which engages the bore 101. On the opposite sides of the O-ring member 115 are suitable felt rings 116 and 117 which are also located in grooves in the skirt portion of the piston member 102. The construction of the embodiment shown in FIG. 6 and described hereinabove is such as to minimize wobble of the piston member and provides for durable long-life structure.

Moreover, in the modification of FIG. 6, the guide ring 77 is eliminated and the piston rod is connected to the bell crank arm 45 by the pin 52 which extends through an opening in the arm 45 rather than through a slot as in the modification of FIG. 3.

It should be apparent that the preferred embodiments of the present invention have been described hereinabove in considerable detail and that certain modifications, changes, and adaptations therein may be made by those skilled in the art to which it relates from the following detailed description thereof, and it is hereby intended to cover all such modifications, changes, and adaptations which fall within the scope of the appended claims.

Having described our invention we claim:

1. In a mechanism having a power transmitting gear element shiftable between power transmitting positions wherein gear teeth thereof mesh with teeth on different cooperating members and the meshing engagement of the teeth resists shifting of the gear element, a lever member operatively connected at one end to said power transmitting gear element to effect movement of the gear element upon movement of the one end of said lever, linkage means connected to the other end of said lever to effect movement of the lever upon actuation thereof, and a piston mechanism for actuating said linkage means against the resistance of said meshing engagement and including a piston member and a piston rod operatively connected at one end to said linkage means and at the other end to said piston member, said linkage means including a pivotal bell crank having first and second arms, said first arm being connected to the other end of said lever to effect movement of the lever upon pivoting movement thereof, and said piston rod operatively connected at one end to said second arm of said bell crank.

2. A mechanism comprising a power transmitting element shiftable between low and high speed power transmitting positions wherein gear teeth thereof mesh with teeth on different cooperating members a lever member operatively connected at one end to said power transmitting element to effect movement of the element upon movement of the one end of said lever, housing means having an opening therein through which the other end of said lever extends, a bell crank member pivotally supported by said housing means and having one arm portion operatively connected with said one end of said lever to effect movement of the lever upon pivoting movement of the bell crank and a second arm movable to effect movement of said first arm, a piston rod operatively connected to the outermost end of said second arm and movable to effect movement of the second arm, a piston member connected to the end of the piston rod opposite the end connected to said second arm, said housing defining a piston chamber in which said piston member is positioned and in which said piston member is movable, guide means encircling said piston member and engaging the walls defining said chamber and guiding the movement of said piston member in said chamber and supporting said piston member against lateral movement of said chamber, spring means encircling said piston rod and engaging said piston member and a portion of said housing and biasing said piston member into a first position wherein the element is in its low speed position, and means connecting said chamber to air pressure to move said piston member against the bias of said spring means to a position wherein said element is in its high speed position.

3. A mechanism for shifting a power transmitting element as defined in claim 2 further including a rolling diaphragm-type sealing means providing a seal between the piston member and said chamber walls so as to maintain an air pressure on the upper side of the piston.

4. A mechanism for shifting a power transmitting element as defined in claim 3 wherein said piston member comprises a cup-shaped member having a base portion and an annular skirt portion extending from the base portion and said diaphragm sealing means includes a portion lying along the base portion and a portion lying along the annular skirt portion.

5. A mechanism for shifting a power transmitting element as claimed in claim 3 wherein the portion of said chamber below said diaphragm-type seal is provided with vent openings venting said chamber to the atmosphere.

6. A mechanism for shifting a member between first and second positions comprising a housing having a bore therein defining a piston chamber, a piston member movable in said chamber including a pair of cup-shaped members having base portions secured together and annular skirt portions extending in opposite directions from their base portions, guide means carried by said skirt portions and guiding movement of said piston member in said chamber, a piston rod connected to said piston member and extending through an opening in a portion of said housing and spring means encircling said piston rod and engaging said portion of said housing and said piston member and biasing said piston member to a first position, a diaphragm seal position between the base portions of said cup-shaped members and the outer periphery thereof being secured between cooperating portions of said housing, said diaphragm seal including a portion lying along the skirt portion of at least one of said cup-shaped members, and means providing a fluid pressure against said piston member for moving said piston member against said spring means.

7. In a mechanism having a power transmitting gear element shiftable between power transmitting positions wherein gear teeth thereof mesh with teeth on different cooperating members and the meshing engagement of the teeth resists shifting of the gear element, a lever member operatively connected at one end to said power transmitting gear element to effect movement of the gear element upon movement of the one end of said lever, linkage means connected to the other end of said lever to effect movement of the lever upon actuation thereof, a housing defining a piston chamber, a piston member positioned in said chamber and movable therein upon the application of air pressure thereto and actuating said linkage upon movement thereof against the resistance of said meshing engagement, and a piston rod operatively connected at one end to said linkage means and at the other end to said piston member and operable to actuate said linkage means upon movement of said piston member, said piston member comprising a pair of cup-shaped members having base portions secured together and annular skirt portions extending outwardly from the base portions in opposite directions, and guide members supported by said annular skirt portions and engaging the walls defining said chamber and guiding movement of said piston member in said chamber.

8. In a mechanism having a power transmitting gear element shiftable between power transmitting positions wherein gear teeth thereof mesh with teeth on different cooperating members and the meshing engagement of the teeth resists shifting of the gear element, a lever member operatively connected at one end to said power transmitting gear element to effect movement of the gear element upon movement of the one end of said lever, linkage means connected to the other end of said lever to effect movement of the lever upon actuation thereof, a housing defining a piston chamber, a piston member positioned in said chamber and movable therein upon the application of air pressure thereto and actuating said linkage upon movement thereof against the resistance of said meshing engagement, a piston rod operatively connected at one end to said linkage means and at the other end to said piston member and operable to actuate said linkage means upon movement of said piston member, and spring means encircling said said piston rod and engaging the underside of said piston member and biasing said piston member in a direction opposite the direction in which the piston member is moved by air pressure, said spring member comprising a coil spring encircling said piston rod and engaging the piston member at one end and a portion of said housing at the other end thereof, said portion of said housing including an opening through which said piston rod extends, and guide means positioned in said opening and snugly encircling said piston rod for guiding movement of said piston rod relative thereto.

9. In a mechanism having a power transmitting gear element shiftable between power transmitting positions wherein gear teeth thereof mesh with teeth on different cooperating members and the meshing engagement of the teeth resists shifting of the gear element, a lever member operatively connected at one end to said power transmitting gear element to effect movement of said gear member upon movement of the one end of said lever, linkage means connected to the other end of said lever to effect movement of the lever upon actuation thereof, and a piston mechanism for actuating said linkage means against the resistance of said meshing engagement and including a piston member and a piston rod operatively connected at one end to said linkage means and at the other end to said piston member and means for introducing pressurized fluid to said piston member, said fluid pressure acting on said piston member when said gear element is in a first position with the teeth thereof meshed with one cooperating member and said fluid pressure operable to act on said piston and move said piston member to effect movement of said gear element out of mesh with said one cooperating member and to a second power transmitting position when the torque transmitted by said gear element in its first position is reduced to a predetermined magnitude.

References Cited
UNITED STATES PATENTS

| | | | |
|---|---|---|---|
| 1,271,207 | 7/1918 | Nickum | 74—116 |
| 1,814,632 | 7/1931 | Rohr | 74—110 X |
| 2,165,985 | 7/1939 | Schwentler | 74—110 |
| 2,621,525 | 12/1952 | Schotz | 74—110 |
| 2,906,855 | 9/1959 | Long | 74—110 X |
| 2,971,393 | 2/1961 | Bartholomew | 74—365 X |

FRED C. MATTERN, JR., *Primary Examiner.*

W. S. RATLIFF, *Assistant Examiner.*